(12) United States Patent
Nagasaki et al.

(10) Patent No.: US 11,103,993 B2
(45) Date of Patent: Aug. 31, 2021

(54) ROBOT SYSTEM, ROBOT SYSTEM CONTROL METHOD, AND ACTION COMMAND GENERATION DEVICE

(71) Applicant: Kabushiki Kaisha Yaskawa Denki, Kitakyushu (JP)

(72) Inventors: Takashi Nagasaki, Kitakyushu (JP); Hirokazu Kariyazaki, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 336 days.

(21) Appl. No.: 15/795,266

(22) Filed: Oct. 27, 2017

(65) Prior Publication Data
US 2018/0117763 A1    May 3, 2018

(30) Foreign Application Priority Data
Oct. 27, 2016    (JP) .............................. JP2016-210953

(51) Int. Cl.
G06F 17/00    (2019.01)
B25J 9/16    (2006.01)
B25J 9/00    (2006.01)

(52) U.S. Cl.
CPC ........... B25J 9/1612 (2013.01); B25J 9/0096 (2013.01); B25J 9/1653 (2013.01); B25J 9/1661 (2013.01); B25J 9/1679 (2013.01); G05B 2219/40102 (2013.01); G05B 2219/40108 (2013.01)

(58) Field of Classification Search
CPC ...... B25J 9/1612; B25J 9/0096; B25J 9/1653; B25J 9/1661; B25J 9/1679; G05B 2219/40102; G05B 2219/40108
See application file for complete search history.

(56) References Cited

U.S. PATENT DOCUMENTS 5,930,461 A * 7/1999 Bernstein ............... B25J 9/1671
                                                                700/247
2011/0060443 A1* 3/2011 Schwarm ............. G05B 13/042
                                                                700/104
(Continued)

FOREIGN PATENT DOCUMENTS

CN    105630005 A    6/2016
EP      2525315 A1    11/2012
(Continued)

OTHER PUBLICATIONS

Sunil V B et al: "WebROBOT: Internet based robotic assembly planning system", Computers in Indu, Elsevier, Amsterdam, NL, vol. 54, No. 2, Jun. 1, 2004 (Jun. 1, 2004), pp. 191-207, XP004503212, ISSN: 0166-3615, DOI: 10.1016/J. COMPIND. 2003.07.008.

(Continued)

*Primary Examiner* — Harry Y Oh
*Assistant Examiner* — Sohana Tanju Khayer
(74) *Attorney, Agent, or Firm* — HEA Law PLLC

(57) ABSTRACT

Provided is a robot system including: a robot including a hand; a unit job storage section configured to store a unit job; a linking job generation section configured to generate a linking job being a command to move the hand from an end position at which a first unit job has ended to a start position at which a second unit job to be executed subsequently after the first unit job is started; an action command generation section configured to generate an action command for the robot by connecting the unit jobs and the linking job in series, based on arrangement of a plurality of processing symbols; and a required time calculation section configured to calculate a required time of the action command by adding required times of the unit jobs and a required time of the linking job.

11 Claims, 9 Drawing Sheets

(56) References Cited

U.S. PATENT DOCUMENTS

| | | | |
|---|---|---|---|
| 2012/0215351 A1* | 8/2012 | McGee | B25J 9/1666 |
| | | | 700/248 |
| 2016/0144507 A1* | 5/2016 | Natsume | G01N 35/0092 |
| | | | 700/214 |
| 2016/0184997 A1 | 6/2016 | Uchiyama | |
| 2016/0227158 A1* | 8/2016 | Nagasaki | G06Q 10/06 |
| 2016/0320774 A1* | 11/2016 | Kuhara | G05D 1/0287 |
| 2017/0015000 A1* | 1/2017 | Kihara | G01N 35/1011 |
| 2018/0046963 A1* | 2/2018 | Kobayashi | G06Q 10/06315 |

FOREIGN PATENT DOCUMENTS

| | | |
|---|---|---|
| EP | 2962814 A2 | 1/2016 |
| EP | 3255136 A1 | 12/2017 |
| JP | H07210233 A | 8/1995 |
| JP | 2009157528 A | 7/2009 |
| JP | 2010092335 A | 4/2010 |
| JP | 2016170606 A | 9/2016 |
| WO | 2016/125259 A1 | 10/2017 |

OTHER PUBLICATIONS

Search Report dated Oct. 8, 2018, for corresponding EP Patent Application No. 18162603.7.
Office Action dated Aug. 13, 2020, for corresponding CN Patent Application No. 201711017379.7 with English translation.
Office Action dated Mar. 19, 2020, for corresponding German Patent Application No. 102017219199.6 with English translation.

* cited by examiner

ROBOT SYSTEM, ROBOT SYSTEM CONTROL METHOD, AND ACTION COMMAND GENERATION DEVICE

INCORPORATION BY REFERENCE

The present disclosure contains subject matter related to that disclosed in Japanese Priority Patent Application JP 2016-210953 filed in the Japan Patent Office on Oct. 27, 2016, the entire contents of which are hereby incorporated by reference.

BACKGROUND OF THE INVENTION

Field of the Invention

The present invention relates to a robot system, a robot system control method, and an action command generation device.

Description of the Related Art

A series of actions of a robot that performs some kind of work may be constructed by combining unit actions. An action command that is a command to control the robot may be made up of a combination of unit jobs corresponding to the unit actions.

In many cases, the required time of work performed by a robot has been relatively short, which is around several seconds to several ten seconds. This allows a user to operate a robot without being mindful of the waiting time till the robot completes the action. When the required time of work performed by a robot is long, however, it is difficult to predict how long a user needs to wait till the robot completes the action, which can disrupt the user's action plan.

An object of the present invention is to provide a robot system, a robot system control method, and an action command generation device, in which a robot is controlled by an action command that enables a user to grasp the waiting time.

SUMMARY OF THE INVENTION

According to one aspect of the present invention, there is provided a robot system including: a robot including at least one hand; a unit job storage section configured to store, based on a processing symbol representing one processing procedure, a unit job being a command issued to the robot to execute the one processing procedure; a linking job generation section configured to generate a linking job being a command to move the at least one hand from an end position at which a first unit job has ended, to a start position, at which a second unit job to be executed subsequently after the first unit job is started; an action command generation section configured to generate an action command for the robot by connecting the first unit jobs, the linking job, and the second job in series, based on arrangement of a plurality of processing symbols; a required time calculation section configured to calculate a required time of the action command by adding required times of the first and second unit jobs and a required time of the linking job; and a robot control section configured to control the robot based on the action command that is generated by the action command generation section.

Further, according to another aspect of the present invention, there is provided a method of controlling a robot system, the method including: generating, based on a processing symbol representing one processing procedure, a linking job being a command to move at least one hand included in a robot from an end position of a first unit job to a start position of a second unit job, the first unit job being a command issued to the robot to execute the one processing procedure, the second unit job being executed subsequently after the first unit job; generating an action command for the robot by connecting, in series, the first unit job, the linking job, and the second job, based on arrangement of a plurality of processing symbols; calculating a required time of the action command by adding required times of the first and second unit jobs and a required time of the linking job; and controlling the robot based on the action command that is generated by the action command generation section.

Further, according to another aspect of the present invention, there is provided an action command generation device including: a unit job storage section configured to store, based on a processing symbol representing one processing procedure, a unit job being a command issued to a robot including at least one hand to execute the one processing procedure; a linking job generation section configured to generate a linking job being a command to move the at least one hand from an end position at which a first unit job has ended to a start position at which a second unit job to be executed subsequently after the first unit job is started; an action command generation section configured to generate an action command for the robot by connecting the first unit job, the linking job, and second job, in series, based on arrangement of a plurality of processing symbols; and a required time calculation section configured to calculate a required time of the action command by adding required times of the first and second unit jobs and a required time of the linking job.

DESCRIPTION OF THE EMBODIMENTS

Figure 1:
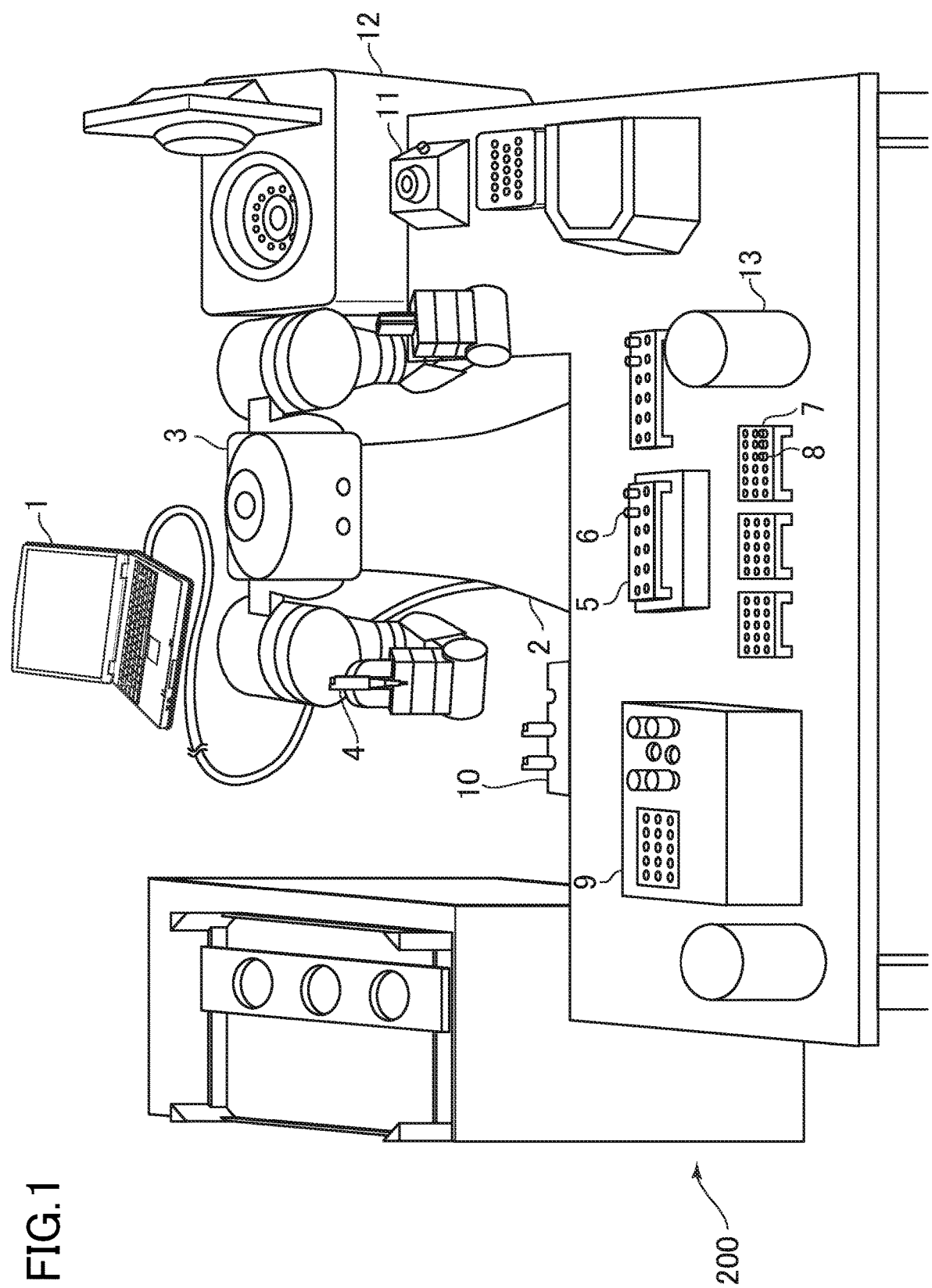
FIG. 1 is a schematic diagram for illustrating the physical configuration of a robot system according to an embodiment of the present invention.

FIG. 1 is a schematic diagram for illustrating the physical configuration of a robot system 200 according to an embodiment of the present invention. The robot system 200 includes an action command generation device 1 configured to generate an action command for a robot 3. The robot system 200 also includes a robot control section 2 configured to control the robot 3 based on an action command generated by the action command generation device 1. The action command generation device 1 itself maybe a dedicated device. However, in this case, the action command generation device 1 is implemented by using a common computer. In other words, a commercially-available computer configured to execute a computer program for causing the computer to operate as the action command generation device 1 is used for the action command generation device 1. The computer program is in general provided in the form of application software, and is used when installed on the computer. The application software may be provided by recording the application software on a compact disc read-only memory (CD-ROM), a digital versatile disc (DVD) ROM, or another suitable computer-readable information recording medium. Further, the application software may be provided over various information communication networks, such as the Internet. In addition, the functions of the application software may be provided by a server at a remote location over an information communication network, that is, maybe implemented by so-called cloud computing.

The robot system 200 includes the robot 3, which has at least one hand. The robot 3 is a multi-joint robot and, in this embodiment, a two-arm robot having a first arm (corresponds to the right arm of the robot 3) and a second arm (corresponds to the left arm of the robot 3), each of which includes a hand. The robot 3 performs processing on a processing target by using each arm independently or moving both arms in a cooperative manner. The first arm and the second arm are specifically arms each having seven or more joints and capable of performing processing on a processing target at a plurality of different postures. A processing target in this embodiment is an object on which a series of tests, cultivation, amplification, or other types of processing in the fields of biochemistry and biotechnology is performed, for example, cultivated cells or a reagent. Processing targets other than the ones given above may be used, and may be machined or assembled/disassembled parts that are welded, fastened with a bolt, or otherwise processed by the robot 3, or goods to be carried for conveyance, palletizing, or other purposes.

Objects to be operated by the arms are not particularly limited. The robot 3 of this embodiment, however, uses the hand installed at the tip of the first arm mainly to operate illustrated or unillustrated laboratory equipment, for example, to grip and operate one of pipettes 4 housed in a pipette rack 10. The robot 3 uses the hand installed at the tip of the second arm to move various illustrated or unillustrated containers, for example, to grip one of microtubes 6 housed in a main rack 5 and move the microtube 6 from the main rack 5 to a vortex mixer 11, a centrifuge 12, or other destinations.

In the example of FIG. 1, the robot system 200 includes the pipettes 4, the main rack 5, the microtubes 6, a tip rack 7, tips 8, an incubator 9, the pipette rack 10, the vortex mixer 11, the centrifuge 12, and a dustbin 13, which are examples of equipment used in an experiment. Other types of equipment may be included in addition to, or in place of, the ones given as examples. For instance, the robot system 200 may include a rack configured to store petri dishes, and a magnet rack. While the robot 3 in this embodiment is a two-arm robot, the at least one hand included in the robot system 200 maybe, for example, installed separately and independently in a plurality of arms and controlled by the robot control section 2 so as to act in cooperation with one another.

Figure 2:
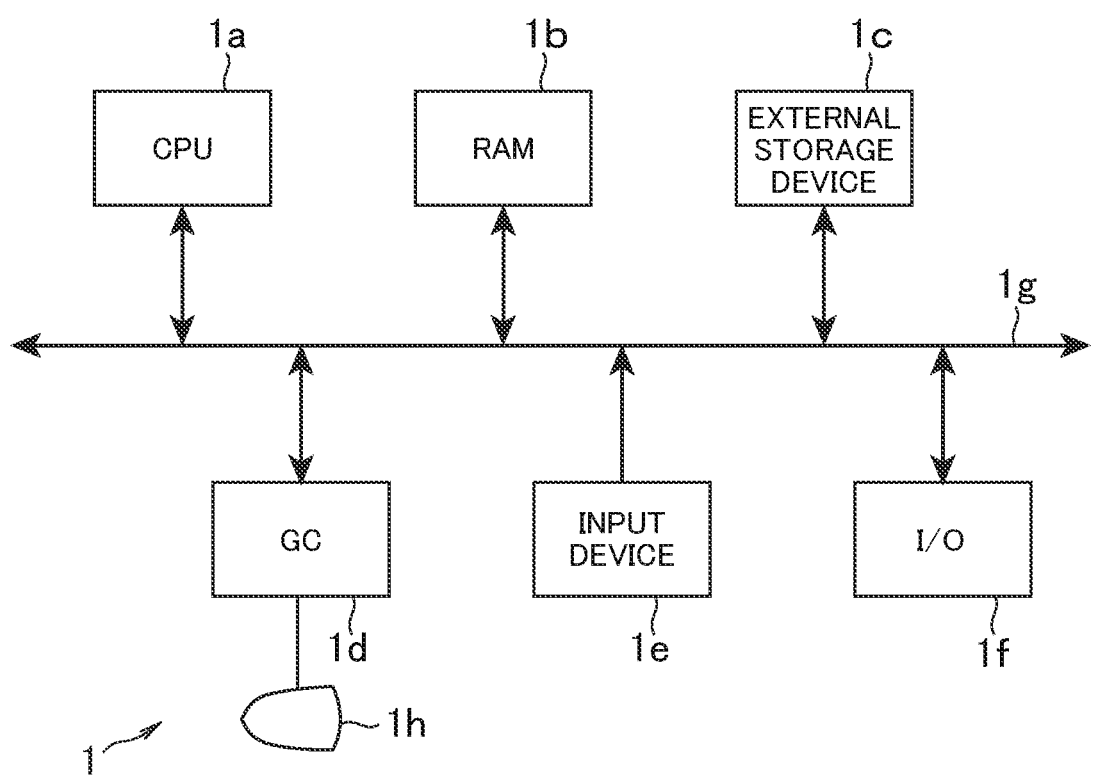
FIG. 2 is a configurational block diagram for illustrating the physical configuration of an action command generation device according to the embodiment of the present invention.

FIG. 2 is a block diagram for illustrating the physical configuration of the action command generation device 1 according to the embodiment of the present invention. The configuration illustrated in FIG. 2 is a general computer to be used as the action command generation device 1. In the computer, a central processing unit (CPU) 1a, a random access memory (RAM) 1b, an external storage device 1c, a graphics controller (GC) 1d, an input device 1e, and an input/output (I/O) 1f are connected to one another by a data bus 1g so that the devices can exchange electric signals therebetween. In this case, the external storage device 1c is a device capable of statically recording information, for example, a hard disk drive (HDD) or a solid state drive (SSD). Further, signals from the GC 1d are output and displayed as an image on a monitor 1h, for example, a flat panel display, which allows the user to visually recognize the image. The input device 1e is a device, for example, a keyboard, a mouse, or a touch panel, which allows the user to input information. The I/O 1f is an interface that allows the action command generation device 1 to exchange information with an external device.

Figure 3:
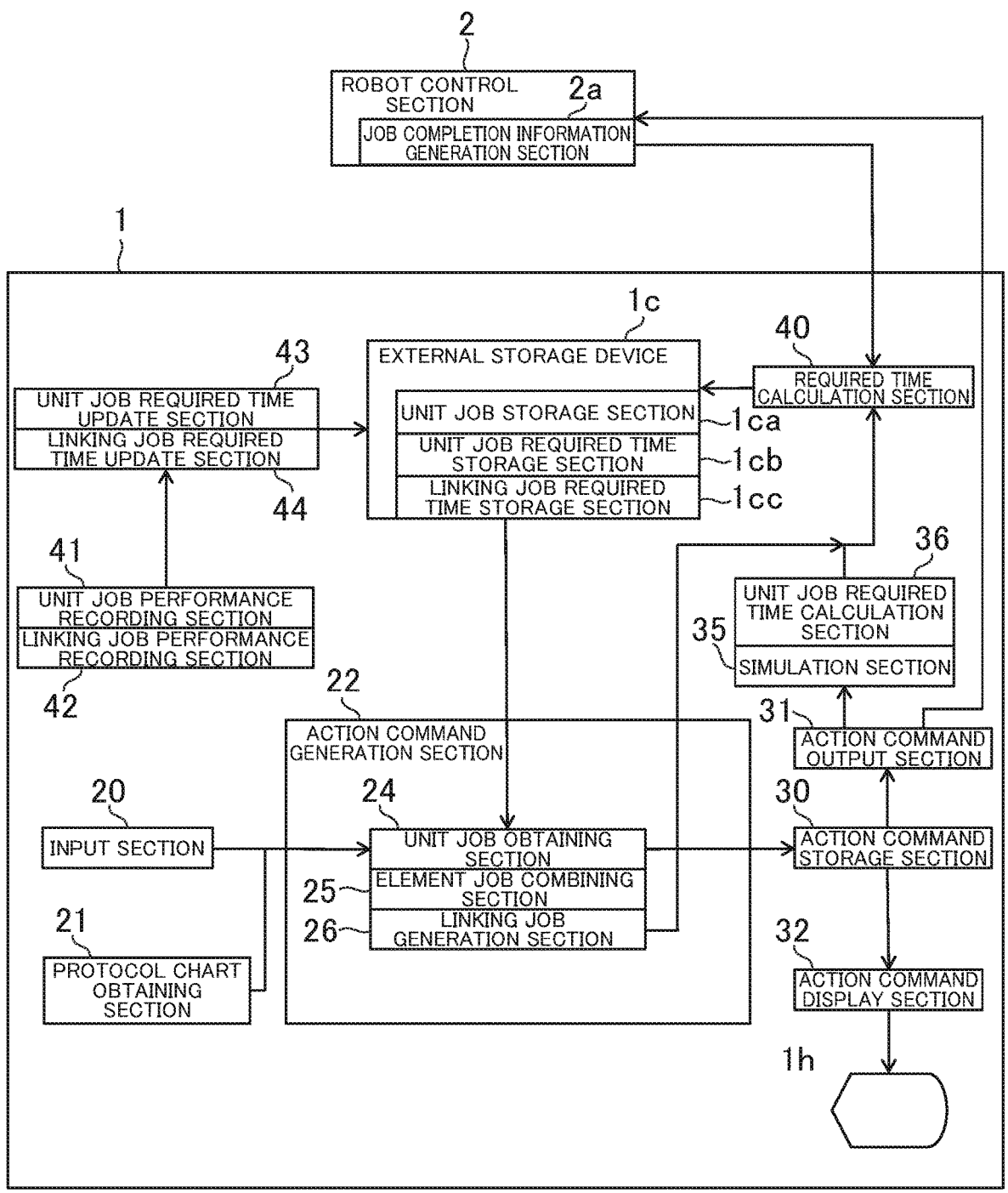
FIG. 3 is a functional block diagram of the action command generation device and a robot control section in the embodiment of the present invention.

FIG. 3 is a functional block diagram of the action command generation device 1 and the robot control section 2 in the embodiment of the present invention. The function blocks illustrated in FIG. 3 focus on the functions of the action command generation device 1 and the like, and there not always exist physical components corresponding to the respective function blocks on a one-to-one basis. Some function blocks may be implemented by an information processing device, for example, the CPU 1a of the action command generation device 1, executing specific software. Further, some function blocks may be implemented by a specific storage area being allocated to an information storage device, for example, the RAM 1b of the action command generation device 1.

The action command generation device 1 includes an input section 20 configured to receive various inputs from the user. The action command generation device 1 also includes a protocol chart obtaining section 21 configured to obtain a protocol chart in which the protocol of an experiment is written, and an action command generation section 22 configured to generate an action command that is a command to control the action of the robot 3, based on an input received by the input section 20. The action command generation device 1 further includes an action command storage section 30 configured to store electronic data of an action command that is being generated and an action command that has been generated, an action command output section 31 configured to output a generated action command as an electronic file in a format that can be read by the robot 3, and an action command display section 32 configured to format electronic data of an action command that is stored in the action command storage section 30, and to display the data on the monitor 1h.

The input unit 20 is normally configured by the input device 1e illustrated in FIG. 2. However, when the action command generation device 1 is an application server used in cloud computing, the I/O 1f into which operation information input by the user on a terminal at a remote location is input corresponds to the input unit 20. The protocol chart obtaining section 21 reads a protocol chart that is input by the user, or a protocol chart that is stored in the external storage device 1c.

In the present application, the term "protocol chart" refers to a diagram that is illustrated in a manner that allows a protocol to be visually understood, and the term "protocol" refers to the work order and conditions of processing to be performed on a processing target in the fields of biochemistry and biotechnology. The protocol chart includes at least a processing symbol 103 representing processing performed on a processing target or a container containing the processing target. Further, the term "processing target" refers to a specimen on which an experiment in the above-mentioned fields is to be performed. In general, the processing target is often a portion of biological tissue, such as a cell or DNA. The experiment is generally performed by placing the processing target in a piece of equipment that is particularly suited to the experiment, such as a microtube 6, a Petri dish, or a microplate (microtiter plate). However, when the term "container" is used by itself in the present application, the term refers to all of those pieces of equipment suitable for containing the processing target in the experiment. While a case in which action commands targeted to the fields of biochemistry and biotechnology are generated is discussed in this embodiment as an example, the action command generation device 1 may generate action commands for commanding the robot 3 to perform processing in other fields, for example, the conveyance of goods or the assembly of a product.

The action command generation section 22 includes a unit job obtaining section 24, an element job combining section 25, and a linking job generation section 26. The action command generation section 22 is configured to generate an action command for the robot 3 by connecting unit jobs and linking jobs in series based on the arrangement of the plurality of processing symbols 103. The unit job obtaining section 24 is configured to obtain a unit job stored in a unit job storage section 1ca, based on one of the plurality of processing symbols 103 each representing one processing procedure. The element job combining section 25 is configured to construct a unit job by combining a plurality of element jobs stored in the unit job storage section 1ca. The linking job generation section 26 is configured to generate a linking job being a command to move at least one hand from an end position at which a first unit job ends to a start position at which a second unit job to be executed subsequently after the first unit job starts. The action command generation section 22 generates an action command by connecting, in series, a plurality of element jobs that correspond to a processing symbol and a linking job, in accordance with a processing condition indicated by the processing symbol, and by repeating this for each processing symbol.

In the present application, the term "action command" refers to a command that is a collection of jobs in which unit jobs and a linking job have been combined, and is a command for instructing processing that is recognized as a single unit to be performed on the processing target or the container in which the processing target is stored. "One processing procedure" means processing that is treated as one unit by the person skilled in the art, for example, pouring a drug solution with the use of one of the pipettes 4 or the transfer of a container in this embodiment. A unit job is a command that commands the robot 3 to execute one processing procedure. In another mode of carrying out the present invention, where the present invention is applied to, for example, a use that involves machined or assembled/disassembled parts, "one processing procedure" means processing that can be treated as one unit by the person skilled in that field, for example, the action of fastening with a desired bolt or the operation of fitting interlocking parts such as gears.

The external storage device 1c includes the unit job storage section 1ca, a unit job required time storage section 1cb, and a linking job required time storage section 1cc. The unit job storage section 1ca is configured to store a unit job being a command issued to the robot 3 to execute one processing procedure, based on one processing symbol 103 representing one processing procedure. The unit job storage section 1ca is also configured to store a plurality of element jobs of which a unit job is created. The unit job required time storage section 1cb is configured to store the required time of a unit job. The unit job required time storage section 1cb stores the required time of a unit job for each of element jobs that make up the unit job. The linking job required time storage section 1cc is configured to store the required time of a linking job.

The action command generation device 1 includes a simulation section 35, a unit job required time calculation section 36, a required time calculation section 40, a unit job performance recording section 41, a linking job performance recording section 42, a unit job required time update section 43, and a linking job required time update section 44. The simulation section 35 is configured to simulate the execution of a unit job by the robot 3. In the robot system 200 according to this embodiment, the simulation section 35 included in the action command generation device 1 performs a simulation by running a model that is a virtually reproduced robot system 200, with the use of the CPU 1a, the RAM 1b, and other hardware resources included in the action command generation device 1. The simulation section 35, however, does not always need to be included in the action command generation device 1, and may be included in a computer separate from the action command generation device 1. The unit job required time calculation section 36 is configured to calculate a required time that is required for the execution of a unit job based on a simulation of the execution of the unit job by the robot 3.

The required time calculation section 40 is configured to calculate the required time of an action command by adding the required times of unit jobs and the required times of linking jobs. The required time of an action command being generated by connecting unit jobs and linking jobs in series, can be calculated by simply adding the required times of the unit jobs and the required times of the linking jobs. According to the robot system 200 of this embodiment, where an action command is generated by connecting unit jobs and linking jobs in series, the overall required time of the action command is calculated by simple addition. This enables the user to grasp the waiting time and make a suitable action plan by knowing the required time of the action command.

The unit job performance recording section 41 is configured to record the actual performance of the required time when a unit job is executed by the robot 3. The linking job performance recording section 42 is configured to record the actual performance of the required time when a linking job is executed by the robot 3. The unit job required time update section 43 is configured to update the required time of a unit job that is stored in the unit job required time storage section 1cb, based on the actual performance of the required time recorded when the unit job is executed. The linking job required time update section 44 is configured to update the required time of a linking job that is stored in the linking job required time storage section 1cc, based on the actual performance of the required time recorded when the linking job is executed.

The robot control section 2 includes a job completion information generation section 2a configured to generate job completion information, which is used to identify at least a unit job or a linking job the execution of which has been finished recently, out of unit jobs and linking jobs that are included in series in an action command. The unit job performance recording section 41 and the linking job performance recording section 42 may record the actual performance of the required time of a unit job or a linking job based on the time at which the job completion information is generated.

Figure 4:
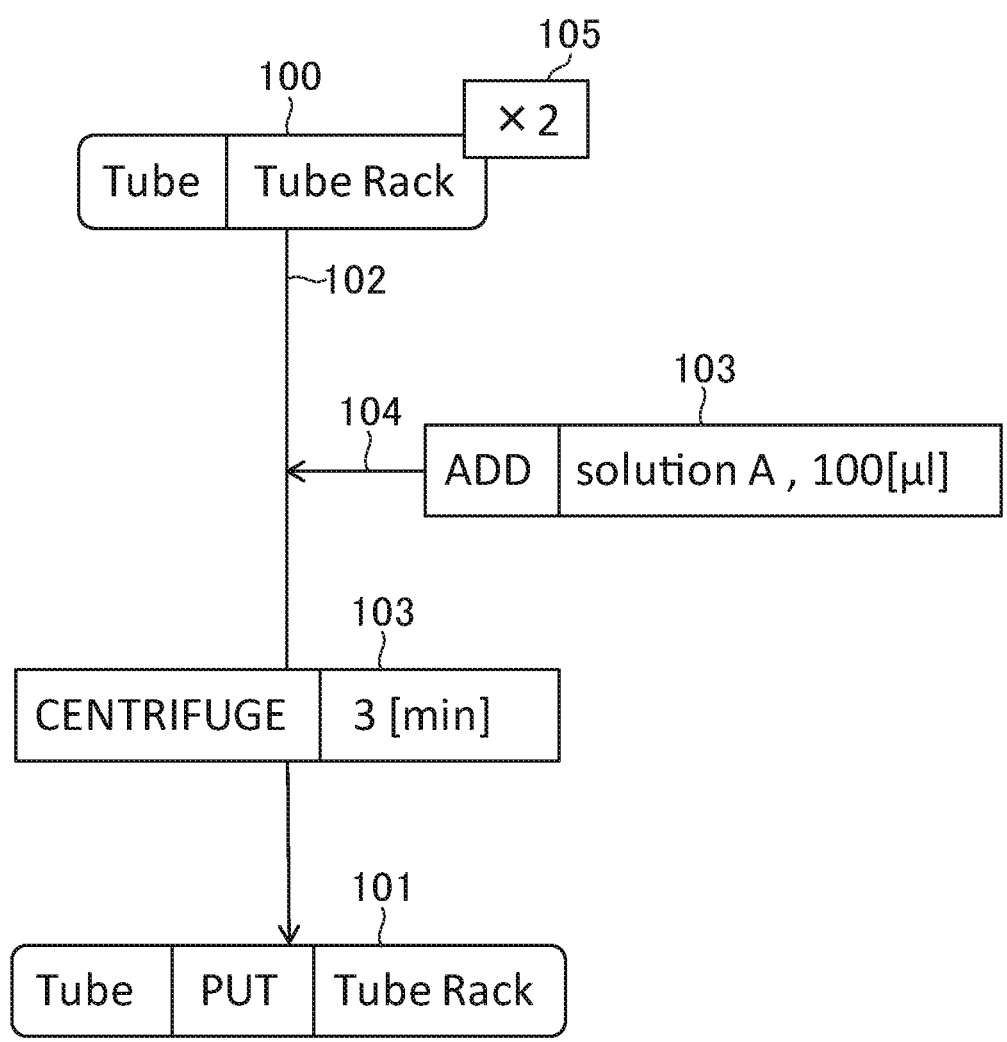
FIG. 4 is a diagram for illustrating an example of a protocol chart that is obtained by the robot system according to the embodiment of the present invention.

FIG. 4 is a diagram for illustrating an example of a protocol chart that is obtained by the robot system 200 according to the embodiment of the present invention. In the protocol chart of this example, an initial symbol 100 representing an initial state of the container containing the processing target and a final symbol 101 representing a final state of the container are arranged in the vertical direction of FIG. 4. The initial symbol 100 and the final symbol 101 are connected by an order line 102 heading from the initial symbol 100 to the final symbol 101. A processing symbol 103 representing an individual processing procedure to be performed on the container is arranged along the order line 102. In the example illustrated in FIG. 4, there are illustrated a combination made up of the initial symbol 100 and the final symbol 101 in which "Tube" is written and the order line 102 connecting the initial symbol 100 and the final symbol 101. In this case, the order line 102 represents the order in which the processing procedures are to be performed as an arrow line. Specifically, the protocol chart of this example indicates that a job represented by the initial symbol 100 in which "Tube" is written is executed first, followed by a job represented by the processing symbol 103 that is connected to the order line 102 with the use of an addition line 104 and that has "ADD" written therein, then by a job represented by the processing symbol 103 in which "CENTRIFUGE" is written, and lastly by a job represented by the final symbol 101 in which "Tube" is written. The protocol chart of this example includes a container count symbol 105 that displays "×2". The container count symbol 105 indicates that two containers specified by the initial symbol 100 are prepared, and that the subsequent processing is to be executed for each of the two containers separately.

The initial symbol 100 represents the processing of transferring "Tube", namely, one of the microtubes 6, from "Tube Rack", namely, a tube rack (the place in which the microtubes 6 are housed) to the main rack 5 being a work space. The processing symbol 103 in which "ADD" is written represents the processing of adding "100 [μl]" of "solution A", namely, a liquid drug A to the microtube 6. The processing symbol 103 in which "CENTRIFUGE" is written indicates that "3 [min]" (3 minutes) of centrifugal processing is to be executed with the microtube 6 set in the centrifuge 12. The final symbol 101 represents the processing of transferring the microtube 6 from the main rack 5 to the tube rack.

Figure 5:
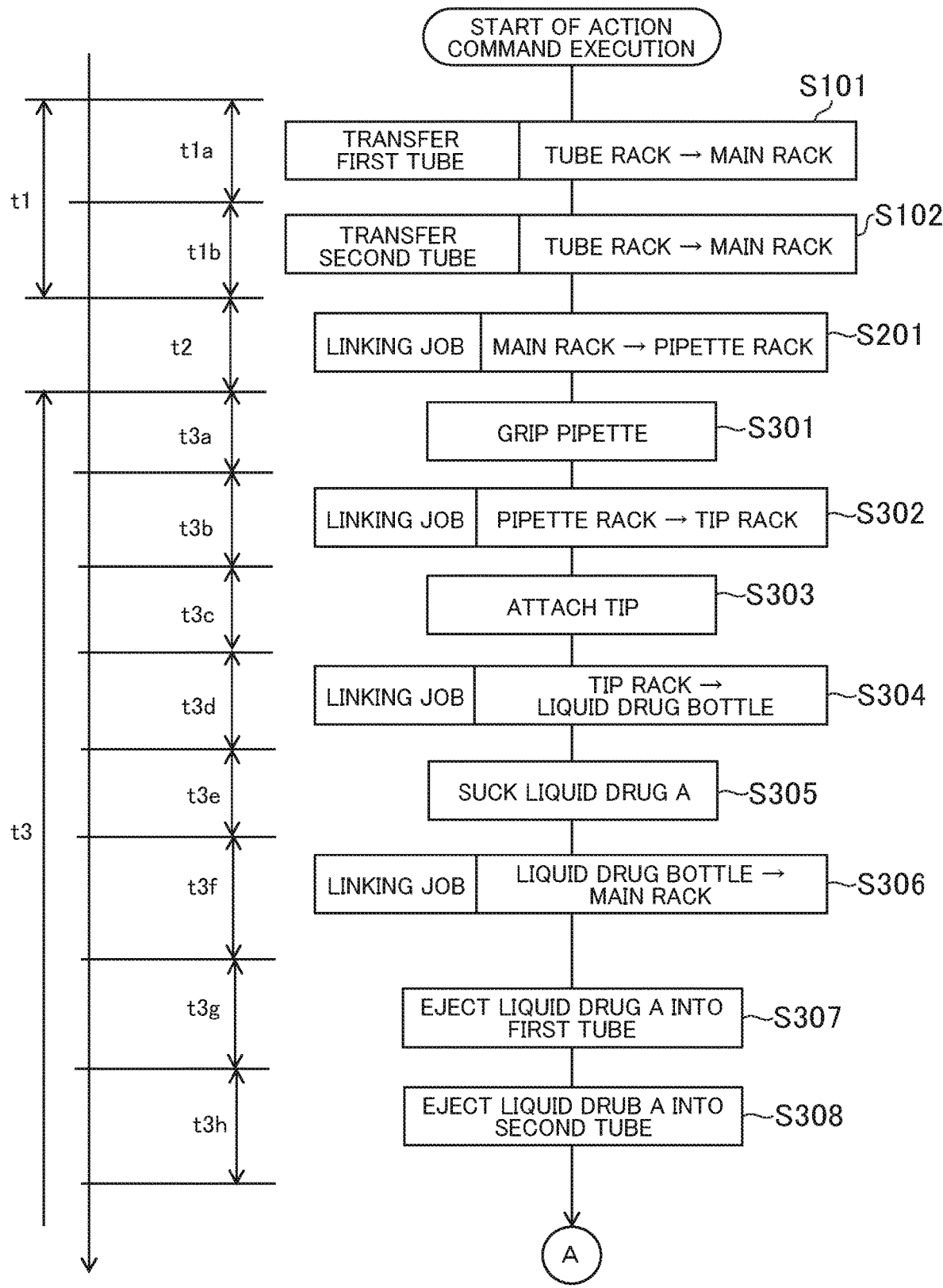
FIG. 5 is a first flow chart for illustrating an example of an action command that is executed by the robot system according to the embodiment of the present invention.
Figure 6:
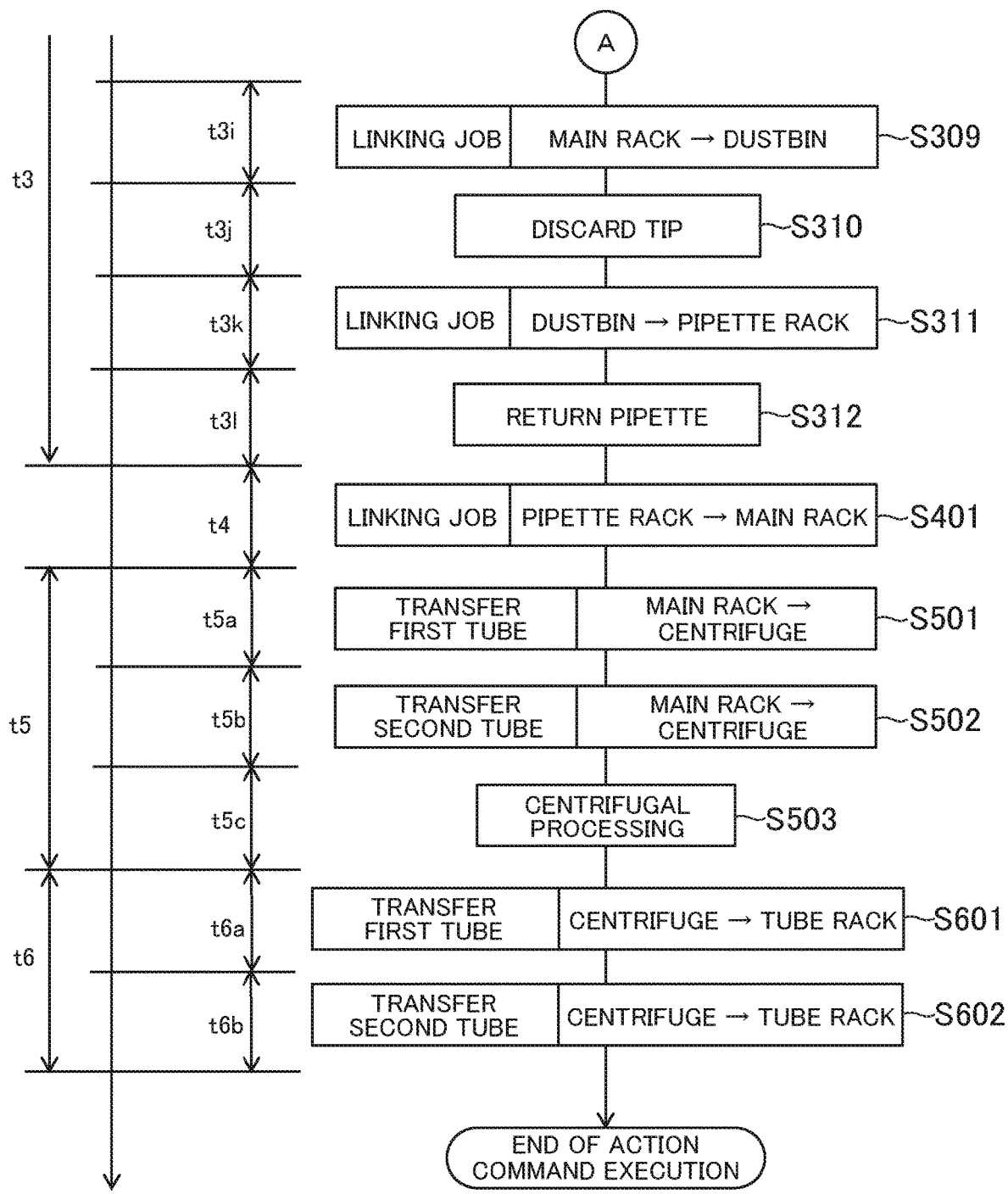
FIG. 6 is a second flow chart for illustrating the example of an action command that is executed by the robot system according to the embodiment of the present invention.

FIG. 5 is a first flow chart for illustrating an example of an action command that is executed by the robot system 200 according to the embodiment of the present invention. Further, FIG. 6 is a second flow chart for illustrating the example of an action command that is executed by the robot system 200 according to the embodiment of the present invention. An example of the action command that is generated by the action command generation device 1 based on the protocol chart of FIG. 4 and that is executed by the robot system 200 is illustrated in the first flow chart and the second flow chart. Processing illustrated in the second flow chart of FIG. 6 is executed subsequently to processing illustrated in the first flow chart of FIG. 5. In FIG. 5 and FIG. 6, the required time of each element job and the required time of each linking job are illustrated on the left side.

First, a unit job in which two microtubes 6 are transferred from the tube rack to the main rack 5 is executed based on the initial symbol 100 and the container count symbol 105. The unit job is made up of an element job in which a first microtube 6a is transferred and an element job in which a second microtube 6b is transferred. Specifically, the job involves transferring the first microtube 6a from the tube rack to the main rack 5 while gripping the microtube 6a in a hand of the robot 3 (Step S101), and transferring the second microtube 6b from the tube rack to the main rack 5 in a similar manner (Step S102).

The unit job required time storage section 1cb stores a required time t1 of the unit job in which two microtubes 6 are transferred from the tube rack to the main rack 5. The unit job required time storage section 1cb also stores a required time t1a of the element job in which the first microtube 6a is transferred from the tube rack to the main rack 5 and a required time t1b of the element job in which the second microtube 6b is transferred from the tube rack to the main rack 5.

Next, a linking job is executed to move the hand of the robot 3 from an end position of the unit job represented by the initial symbol 100 to a start position for the processing symbol 103 in which "ADD" is written. Specifically, a job of moving the hand of the robot 3 from the main rack 5 to the pipette rack 10 is executed (Step S201). The linking job required time storage section 1cc stores a required time t2 of the linking job in which the hand of the robot 3 is moved from the main rack 5 to the pipette rack 10.

After that, a unit job of adding 100 μl of liquid drug A to each of the two microtubes 6 is executed based on the processing symbol 103 in which "ADD" is written and the container count symbol 105. This unit job is made up of twelve element jobs. The included element jobs are specifically a job of gripping one of the pipettes 4 in the hand of the robot 3 (Step S301), a job of moving the hand from the pipette rack 10 to the tip rack 7 (Step S302), a job of attaching one of the tips 8 to the tip of the pipette 4 (Step S303), a job of moving the hand from the tip rack 7 to a liquid drug bottle (Step S304), a job of sucking the liquid drug A out of the liquid drug bottle by operating the pipette 4 with the hand (Step S305), a job of moving the hand from the liquid drug bottle to the main rack 5 (Step S306), a job of ejecting 100 μl of liquid drub A into the first microtube 6a housed in the main rack 5 (Step S307), a job of ejecting 100 μl of liquid drub A into the second microtube 6b housed in the main rack 5 (Step S308), a job of moving the hand from the main rack 5 to the dustbin 13 (Step S309), a job of discarding the tip 8 attached to the pipette 4 (Step S310), a job of moving the hand from the dustbin 13 to the pipette rack 10, a job of moving the hand from the dustbin 13 to the pipette rack 10 (Step S311), and a job of returning the pipette 4 that is gripped in the hand to the pipette rack 10 (Step S312).

A required time t3 of the unit job corresponding to the processing symbol 103 in which "ADD" is written and the container count symbol 105, and required times t3a to t3l of element jobs that make up this unit job are stored in the unit job required time storage section 1cb.

The action command generation section 22 of the action command generation device 1 according to this embodiment generates an action command by connecting, in series, a plurality of element jobs that correspond to one processing symbol 103 and a linking job, in accordance with a processing condition indicated by the processing symbol 103, and by repeating this for each processing symbol 103. A processing condition is the specification of an argument or a maneuver in the processing symbol 103, and includes ones that cannot be checked on a protocol chart. The processing condition of the processing symbol 103 in which "ADD" is written is to add 100 μl of the liquid drug A in this example. The required time calculation section 40 calculates the required time of an action command by adding the required times of a plurality of element jobs and the required times of linking jobs. When a different processing condition is indicated by the processing symbol 103, different jobs make up the unit job that corresponds to this processing symbol 103, and the required time of the unit job consequently changes. According to the robot system 200 of this embodiment, the required time of an action command is predicted accurately even when a change in processing condition changes element jobs that make up a unit job.

A linking job is subsequently executed to move the hand of the robot 3 from the end position of the unit job represented by the processing symbol 103 in which "ADD" is written to a start position for the processing symbol 103 in which "CENTRIFUGE" is written. Specifically, a job of moving the hand of the robot 3 from the pipette rack 10 to the main rack 5 is executed (Step S401). The linking job required time storage section 1cc stores a required time t4 of the linking job in which the hand of the robot 3 is moved from the pipette rack 10 to the main rack 5.

A unit job is executed next to perform centrifugal processing for each of the two microtubes 6 based on the processing symbol 103 in which "CENTRIFUGE" is written and the container count symbol 105. This unit job is made up of a job of transferring the first microtube 6a from the main rack 5 to the centrifuge 12 while gripping the first microtube 6a in the hand (Step S501), a job of transferring the second microtube 6b from the main rack 5 to the centrifuge 12 while gripping the second microtube 6b in the hand (Step S502), and a job of performing 3 minutes of centrifugal processing by activating the centrifuge 12 (Step S503).

A required time t5 of the unit job corresponding to the processing symbol 103 in which "CENTRIFUGE" is written and the container count symbol 105, and required times t5a, t5b, and t5c of element jobs that make up this unit job are stored in the unit job required time storage section 1cb.

In the example of the protocol chart illustrated in FIG. 4, the processing symbol 103 in which "CENTRIFUGE" is written indicates a processing condition that includes the specification of a processing time. The specified processing time is 3 minutes. The required time calculation section 40 calculates the required time of an action command by adding the processing time in each processing condition, the required times of unit jobs, and the required times of linking jobs. In this example, the processing time of the job in which centrifugal processing is performed by activating the centrifuge 12 (Step S503) varies depending on what processing condition is indicated by the processing symbol 103 in which "CENTRIFUGE" is written. According to the robot system 200 of this embodiment, the required time of an action command is predicted accurately even when a relatively long processing time creates a waiting time in which the robot 3 stands by.

Lastly, a unit job is executed to transfer the two microtubes 6 from the centrifuge 12 to the tube rack based on the final symbol 101 and the container count symbol 105. The unit job is made up of an element job in which the first microtube 6a is transferred and an element job in which the second microtube 6b is transferred. Specifically, the job involves transferring the first microtube 6a from the centrifuge 12 to the tube rack while gripping the microtube 6a in the hand of the robot 3 (Step S601), and transferring the second microtube 6b from the centrifuge 12 to the tube rack in as similar manner (Step S602). The unit job required time storage section 1cb stores a required time t6 of the unit job in which the two microtubes 6 are transferred from the centrifuge 12 to the tube rack. The unit job required time storage section 1cb also stores a required time t6a of the element job in which the first microtube 6a is transferred from the centrifuge 12 to the tube rack and a required time 6tb of the element job in which the second microtube 6b is transferred from the centrifuge 12 to the tube rack. This completes the execution of the action command.

The job completion information generation section 2a of the robot control section 2 generates job completion information, which is used to identify at least a unit job or a linking job the execution of which has been finished recently, out of unit jobs and linking jobs that are included in series in an action command. In this example, the job completion information generation section 2a generates, for instance, job completion information that identifies the unit job of transferring the first microtube 6a and the second microtube 6b from the tube rack to the main rack 5 when the execution of the unit job of transferring the first microtube 6a and the second microtube 6b from the tube rack to the main rack 5 is completed. The required time calculation section 40 calculates the remaining required time of an action command by adding the required times of unit jobs and linking jobs that are unfinished, based on job completion information. In the example given above, the required time calculation section 40 calculates the remaining required time of the action command as t2+t3+t4+t5+t6 by adding up t2 to t6, which are the required times of unit jobs and linking jobs that are unfinished, based on the job completion information that identifies the unit job of transferring the first microtube 6a and the second microtube 6b from the tube rack to the main rack 5.

According to the robot system 200 of this embodiment, the remaining required time of an action command is calculated by transmitting the current state of the robot 3 from the robot control section 2 to the required time calculation section 40. This enables the user to grasp the remaining waiting time and make a suitable action plan.

Figure 7:
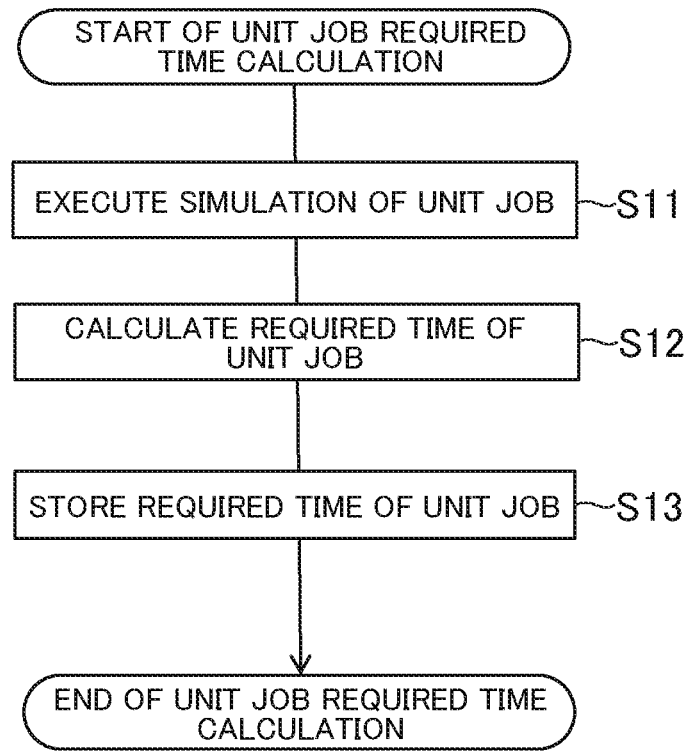
FIG. 7 is a flow chart for illustrating an example of unit job required time calculation, which is executed by the robot system according to the embodiment of the present invention.

FIG. 7 is a flow chart for illustrating an example of unit job required time calculation, which is executed by the robot system 200 according to the embodiment of the present invention. When an action command is generated by the action command generation section 22 based on a protocol chart, the simulation section 35 executes a simulation in which the robot 3 performs a unit job (Step S11). The simulation section 35 does not always need to simulate a linking job, and is only required to simulate at least unit jobs included in an action command. This is because the arm trajectory and required time of a linking job, which is generated by the linking job generation section 26, are already obtained.

The unit job required time calculation section 36 calculates the time required for the execution of a unit job, based on the simulation of the execution of the unit job by the robot 3 (Step S12). The unit job required time calculation section 36 calculates the required time of the unit job by calculating a required time for each of element jobs that make up the unit job. The unit job required time storage section 1cb stores the required time of the unit job that is calculated by the unit job required time calculation section 36. The unit job required time storage section 1cb stores the required time of the unit job by storing a required time for each of element jobs that make up the unit job.

According to the robot system 200 of this embodiment, the required time of a unit job can be found out without actually executing the unit job, and the overall required time of an action command can accordingly be grasped.

Figure 8:
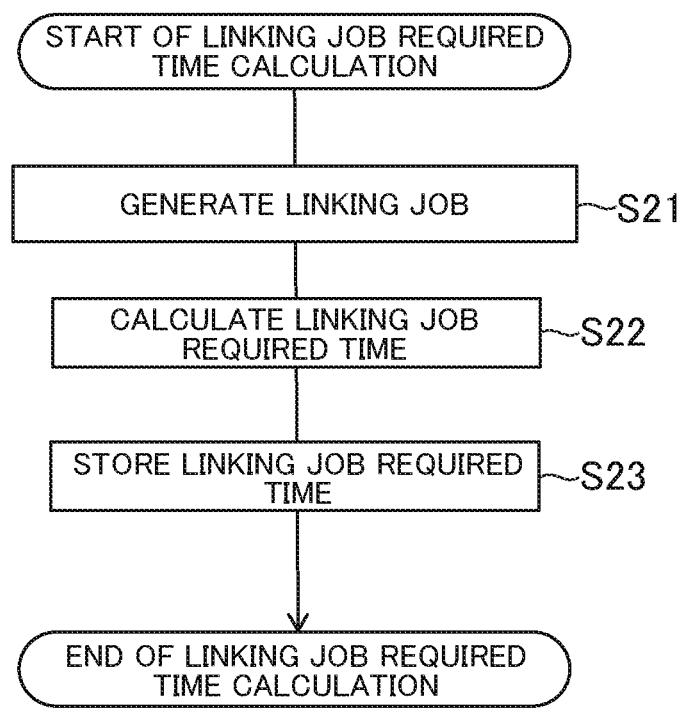
FIG. 8 is a flow chart for illustrating linking job required time calculation, which is executed by the robot system according to the embodiment of the present invention.

FIG. 8 is a flow chart for illustrating linking job required time calculation, which is executed by the robot system 200 according to the embodiment of the present invention. The linking job generation section 26 generates a linking job in which a hand is moved from an end position of one of two successive unit jobs to the start position of the other unit job (Step S21). The generation of the linking job is accompanied by the calculation of the required time of the linking job by the linking job generation section 26 (Step S22). The linking job generation section 26 may generate a linking job through automatic path generation that is calculated to avoid interference between the hand and peripheral equipment, and the required time of a generated linking job is calculated from the trajectory and traveling speed of the hand in the linking job. The linking job required time storage section 1cc stores the required time of the linking job that is calculated by the linking job generation section 26 (Step S23).

According to the robot system 200 of this embodiment, the required time of a linking job can be found out without actually executing the linking job, and the overall required time of an action command can accordingly be grasped.

Figure 9:
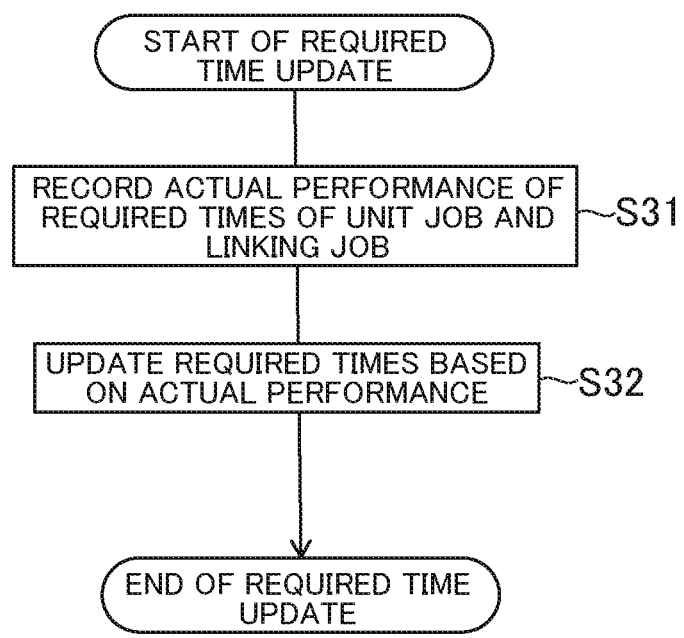
FIG. 9 is a flow chart for illustrating an example of required time update, which is executed by the robot system according to the embodiment of the present invention.

FIG. 9 is a flow chart for illustrating an example of required time update, which is executed by the robot system 200 according to the embodiment of the present invention. The unit job performance recording section 41 records the actual performance of the required time when a unit job is recorded by the robot 3 (Step S31). The linking job performance recording section 42 records the actual performance of the required time when a linking job is executed by the robot 3 (Step S31). The interval between the issuing of pieces of job completion information generated by the robot control section 2 may be used to determine the actual performance of a required time.

The unit job required time update section 43 updates the required time of the unit job that has been stored in the unit job required time storage section 1cb, based on the actual performance of the required time recorded when the unit job is executed (Step S32). The linking job required time update section 44 updates the required time of the linking job that has been stored in the linking job required time storage section 1cc, based on the actual performance of the required time recorded when the linking job is executed (Step S32).

According to the robot system 200 of this embodiment, the required time of a unit job can be corrected based on actual performance, which leads to even more accurate prediction of the required time of an action command. The required time of a linking job can also be corrected based on actual performance, which leads to even more accurate prediction of the required time of an action command.

In the action command example described above, the robot 3 executes one processing procedure at a time as opposed to executing two or more processing procedures in parallel. The robot system 200 may issue an action command that commands the robot 3 to execute two or more processing procedures in parallel, for example, executing a first unit job with a first arm of the robot 3 while executing a second unit job with a second arm of the robot 3. In the case of an action command that commands the robot 3 to execute two or more processing procedures in parallel, the required time calculation section 40 may compare the required times of the two or more unit jobs executed in parallel to employ the longest required time as the required time of the two or more unit jobs executed in parallel.

Each of the configurations in the embodiment above is described as a specific example, and the invention disclosed in the present application is not intended to be limited to those specific configurations themselves. While the embodiment described in detail deals with an example in which the present invention is applied to processing performed on a processing target in the fields of biochemistry and biotechnology, work processed and executed by the robot is not limited thereto as described above. The person skilled in the art may make various modifications to the disclosed embodiment, for example, adding or changing a function or an operation method, and the control illustrated in the flow charts may be replaced by other forms of control that have an equivalent function. It is to be understood that the technical scope of the invention disclosed in the present application covers such modifications as well. It should be understood by those skilled in the art that various modifications, combinations, sub-combinations and alterations may occur depending on design requirements and other factors insofar as they are within the scope of the appended claims or the equivalents thereof.

What is claimed is:

1. A robot system, comprising:
a robot comprising at least one hand;
a central processing unit; and
a memory in communication with the central processing unit;
wherein the central processing unit and the memory are in communication with each other and are in communication with the robot, and the central processing unit and the memory are configured to operate as:
a unit job storage section configured to store, based on a processing symbol representing one processing procedure, a unit job being a command issued to the robot to execute the one processing procedure;
a linking job generation section configured to generate a linking job being a command to move the at least one hand from an end position at which a first unit job has ended, to a start position, at which a second unit job to be executed subsequently after the first unit job is started, wherein the linking job generation section generates the linking job by automatically generating a link job path that is calculated to avoid interference between the at least one hand and any peripheral equipment;
a protocol chart obtaining section configured to obtain a protocol chart;
an action command generation section configured to generate an action command for the robot by connecting the first unit job which corresponds to a first processing symbol depicted in the protocol chart in accordance with a processing condition indicated by the first processing symbol, the linking job which is not depicted in the protocol chart, and the second unit job which corresponds to a second processing symbol depicted in the protocol chart in accordance with a processing condition indicated by the second processing symbol in series, based on arrangement of a plurality of processing symbols in the protocol chart;
a required time calculation section configured to calculate a required time of the action command by adding required times of the first and second unit jobs and a required time of the linking job; and a robot control section configured to control the robot based on the action command that is generated by the action command generation section.

2. The robot system according to claim 1,
wherein the unit job storage section is configured to store a plurality of element jobs, wherein each of the unit jobs is created,
wherein the action command generation section is configured to generate the action command by connecting, in series, the plurality of element jobs that correspond to one of the plurality of processing symbols and the linking job, in accordance with a processing condition indicated by the one of the plurality of processing symbols, and by repeating the connection for each of the plurality of processing symbols, and
wherein the required time calculation section is configured to calculate the required time of the action command by adding required times of the plurality of element jobs and the required time of the linking job.

3. The robot system according to claim 1,
wherein a processing condition indicated by the processing symbol comprises an indication of a processing time, and
wherein the required time calculation section is configured to calculate the required time of the action command by adding the processing time, the required times of the unit jobs, and the required time of the linking job.

4. The robot system according to claim 1,
wherein the robot control section is configured to generate job completion information, which is used to identify at least the unit job or the linking job, the execution of which has been finished recently, out of the unit jobs and the linking jobs that are included in series in the action command, and
wherein the required time calculation section is configured to calculate a remaining required time of the action command by adding the required times of the unit jobs and the linking jobs that are unfinished, based on the job completion information.

5. The robot system according to claim 1, wherein the central processing unit and the memory are further configured to operate as:
a unit job required time calculation section configured to calculate, for each of the unit jobs, a required time that is required for execution of each of the unit jobs, based on a simulation of the execution of each of the unit jobs by the robot; and
a unit job required time storage section configured to store the required time of each of the unit jobs.

6. The robot system according to claim 5, wherein the central processing unit and the memory are further configured to operate as:
a unit job performance recording section configured to record, for each of the unit jobs, actual performance of the required time when each of the unit jobs is executed by the robot; and
a unit job required time update section configured to update, for each of the unit jobs, the required time of each of the unit jobs that has been stored in the unit job required time storage section, based on the actual performance of the required time recorded when each of the unit jobs is executed.

7. The robot system according to claim 1,
wherein the linking job generation section is configured to perform, for each linking job, calculation of the required time of each linking job along with generation of each linking job, and
wherein the robot system further comprises a linking job required time storage section configured to store the required time of each linking job.

8. The robot system according to claim 7, wherein the central processing unit and the memory are further configured to operate as:
a linking job performance recording section configured to record, for each linking job, actual performance of the required time when each linking job is executed by the robot; and
a linking job required time update section configured to update, for each linking job, the required time of each linking job that has been stored in the linking job required time storage section, based on the actual performance of the required time recorded when each linking job is executed.

9. A method of controlling a robot system, comprising:
generating, based on a processing symbol representing one processing procedure, a linking job being a command to move at least one hand included in a robot from an end position of a first unit job to a start position of a second unit job, the first unit job being a command issued to the robot to execute the one processing procedure, the second unit job being executed subsequently after the first unit job, wherein generating the linking job is accomplished by automatically generating a link job path that is calculated to avoid interference between the at least one hand and any peripheral equipment;
obtaining a protocol chart;
generating an action command for the robot by connecting, in series, the first unit job, which corresponds to a first processing symbol depicted in the protocol chart in accordance with a processing condition indicated by the first processing symbol, the linking job which is not depicted in the protocol chart, and the second unit job which corresponds to a second processing symbol depicted in the protocol chart in accordance with a processing condition indicated by the second processing symbol, based on arrangement of a plurality of processing symbols in the protocol chart;
calculating a required time of the action command by adding required times of the first and second unit jobs and a required time of the linking job; and
controlling the robot based on the action command that is generated by an action command generation section.

10. An action command generation device, comprising:
a unit job storage section configured to store, based on a processing symbol representing one processing procedure, a unit job being a command issued to a robot comprising at least one hand to execute the one processing procedure;
a linking job generation section configured to generate a linking job being a command to move the at least one hand from an end position at which a first unit job has ended to a start position at which a second unit job to be executed subsequently after the first unit job is started, wherein the linking job generation section generates the linking job by automatically generating a link job path that is calculated to avoid interference between the at least one hand and any peripheral equipment;
a protocol chart obtaining section configured to obtain a protocol chart;
an action command generation section configured to generate an action command for the robot by connecting the first unit job which corresponds to a first processing symbol depicted in the protocol chart in accordance with a processing condition indicated by the first processing symbol, the linking job which is not depicted in the protocol chart, and the second unit job which corresponds to a second processing symbol depicted in the protocol chart in accordance with a processing condition indicated by the second processing symbol in series, based on arrangement of a plurality of processing symbols in the protocol chart; and a required time calculation section configured to calculate a required time of the action command by adding required times of the first and second unit jobs and a required time of the linking job.

11. A robot system, comprising:

a robot comprising at least one hand;

a unit job storage section configured to store, based on a processing symbol representing one processing procedure, a unit job being a command issued to the robot to execute the one processing procedure;

a linking job generation section configured to generate a linking job being a command to move the at least one hand from an end position at which a first unit job has ended, to a start position, at which a second unit job to be executed subsequently after the first unit job is started, wherein the linking job generation section generates the linking job by automatically generating a link job path that is calculated to avoid interference between the at least one hand and any peripheral equipment;

a protocol chart obtaining section configured to obtain a protocol chart;

an action command generation section configured to generate an action command for the robot by connecting the first unit job which corresponds to a first processing symbol depicted in the protocol chart in accordance with a processing condition indicated by the first processing symbol, the linking job which is not depicted in the protocol chart, and the second unit job which corresponds to a second processing symbol depicted in the protocol chart in accordance with a processing condition indicated by the second processing symbol in series, based on arrangement of a plurality of processing symbols in the protocol chart;

a required time calculation section configured to calculate a required time of the action command by adding required times of the first and second unit jobs and a required time of the linking job; and a robot control section configured to control the robot based on the action command that is generated by the action command generation section.

* * * * *